Jan. 12, 1954        D. J. CESARE        2,665,649
DEVICE FOR CUTTING AND FORMING MEAT PATTIES AND THE LIKE
Filed March 20, 1952
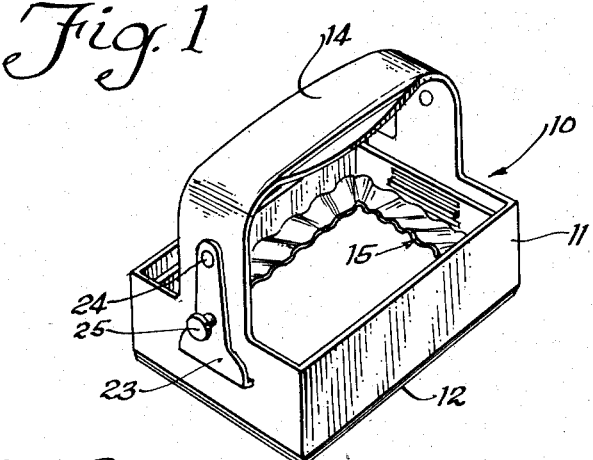
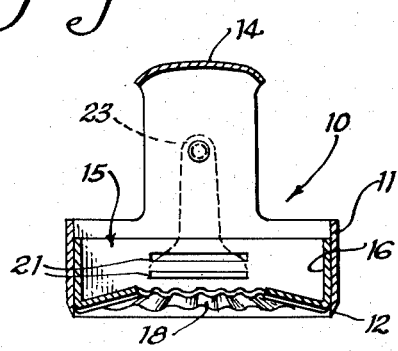
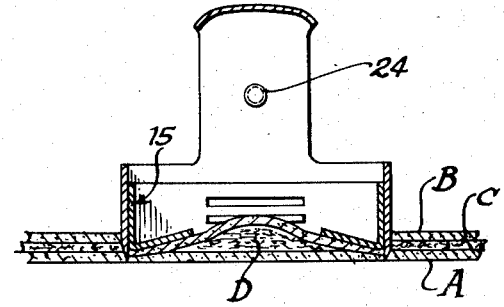
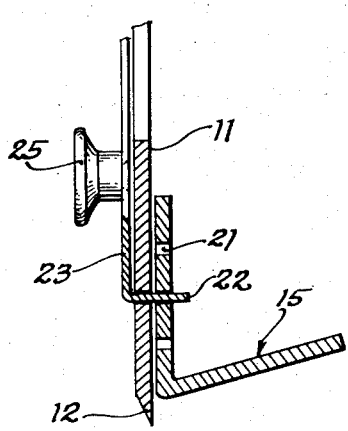
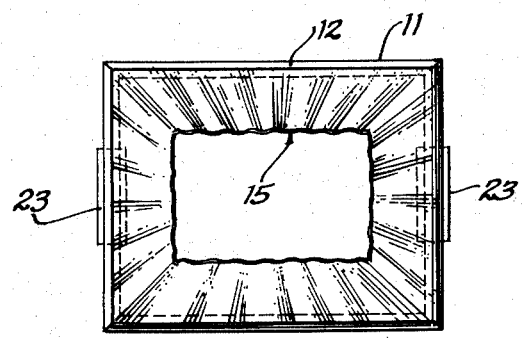
INVENTOR.
Dominec J. Cesare
BY
Leonard S. Khmyfeld
Attorney Patented Jan. 12, 1954

2,665,649

UNITED STATES PATENT OFFICE 2,665,649

DEVICE FOR CUTTING AND FORMING MEAT PATTIES AND THE LIKE

Dominec J. Cesare, Chicago, Ill.

Application March 20, 1952, Serial No. 277,615

3 Claims. (Cl. 107—47)

This invention relates to a device for cutting and forming meat patties and the like.

In my co-pending application Serial Number 237,335, filed July 18, 1951, I have disclosed a cutter and crimper for preparing ravioli and similar comestibles comprising an envelope of dough containing chopped meat or other suitable filling.

One of the important considerations governing the preparation of ravioli or patties of that general type is the proper sealing of the dough at the periphery to insure that the filling will not leak out or the fluid, e. g. water, in which the article is cooked, will not seep in to spoil the flavor. Articles, such as cookies filled with fruit, and closed by crimping, also present a similar problem, since, if not securely closed, the juices, e. g. sugar, can run out, and will carbonize on the baking pan. Cleaning is then extremely difficult.

One of the principal objects of this invention is to simplify the device disclosed in my application aforesaid, and in so doing render the same cheaper to manufacture and to use.

Another object is to provide a device which may be easily adjusted for various thicknesses of articles to be prepared thereby, and by means of which feature the device is easily disassembled for cleaning.

Other objects will appear from the following description taken in connection with the accompanying drawing, in which latter:

Fig. 1 shows a perspective view of a device in accordance with the invention;

Fig. 2 is a transverse cross section thereof;

Fig. 3 is a view similar to Fig. 2 but showing the device in use;

Fig. 4 is a somewhat enlarged cross-sectional detail of the adjusting means for the crimping die; and Fig. 5 shows a bottom plan view of the device.

Generally regarded the invention comprises a vertically disposed frame including a sharpened edge for severing the dough, the frame also serving as a holder and guide for the crimping die. This latter is made adjustable vertically in the frame by providing a series of apertures therein engageable selectively by latches to fix a preferred position of the die with relation to the cutting edge. The arrangement for adjusting the die is such that it allows complete disassociation of the die and frame for simplifying cleaning of the parts.

At this juncture it will be understood that one customary mode of preparing ravioli—and such comestible will be referred to herein as one example of a product which the device is particularly adapted to prepare—is to place the lower sheet of dough on a table, to deposit small mounds of chopped meat or other filling at spaced intervals thereon, then to lay another sheet of dough thereover and to cut the dough around each mound to separate the patties. The edges are then crimped with a fork or otherwise to seal them for cooking. The present invention eliminates at least the second and last of these steps, and in a manner to be described.

Turning now to the drawing there is shown a frame 10 comprising a sheet metal rectangular shell 11 having a sharpened lower periphery or edge 12. It will become apparent from what follows that the contour of the frame 11 need not be rectangular since the principles of the invention are applicable regardless of the outline of the finished product. For manipulating the device there is provided a handle 14.

Arranged within the shell and adapted to be vertically guided thereby is the crimping die 15, also preferably of sheet metal, and including vertical walls 16 juxtaposed to the interior faces of the shell 11 for adjustment with respect thereto, and including an inwardly directed sloped working face 18. For imparting an esthetic appearance to the finished product the face 18 is corrugated, although the same may be flat or otherwise formed to impart a desired artistic effect to the product. However, one of the important desiderata of my invention resides in providing an upwardly and inwardly sloping lower surface in order that the die may not only close and crimp the edges of the patty but will force the meat into a mound in a manner to be hereinafter explained in detail.

It is desirable to provide a device of the character contemplated by the invention which may perform its dual function of cutting and sealing notwithstanding variation in the thickness of the dough. To this end the die 15 is made adjustable by providing in at least two apposed walls thereof a series of slots 21 (Fig. 4), in this case shown exemplificatively as three, engageable by the inturned lip 22 of each of a pair of resilient latches 23. These latter are secured at one end by rivets 24—24, welding or otherwise to the vertical legs of the handle 14, and are equipped with handles 25—25 or equivalent means for overcoming the tension thereof whereby to disengage the lips 22 from the then-engaged slot 21. Upon such action the die 15 is free to be moved upwardly or downwardly, as the case may be, to position the die further away or closer to the edge 12, and thus to determine the setting of the die with respect to the dough. Obviously the latches 23 will, upon release, be self-engaging with the newly selected pair of slots 21.

Referring to Fig. 3 there is shown a lower sheet of dough A, an upper sheet of dough B, and a layer of filling C spread therebetween. When employing the invention implement it is unnecessary laboriously to form and to distribute separated mounds of filling, since the novel action of the sealing and crimping die is effective to force the relatively plastic filling away from the edges of the patty into a mound D as shown. Concurrently the adjacent faces of the portions of dough which have just been severed are pressed into contact by the die, and caused mutually to cohere by the uniform pressure applied around the entire periphery of the patty.

In the event the initial combined thickness of the two layers of dough and the filling is thicker or thinner than the article for which the die position of Fig. 4 is intended, it is a simple operation to withdraw the latches 23 from the position shown and to move the die to another of its adjusted positions, whereupon the latches are permitted to re-engage.

Moreover by providing adjusting means for the die which are completely disengageable therefrom the die may be readily separated from the remainder of the implement for cleaning. The elongated form of the apertures 21, and the congruent latch finger 22 successfully counteract any tendency of the die 15 to rock and to produce patties which are thicker on one side than on the other.

From the foregoing it will have become evident that the invention implement not only possesses the several advantages heretofore alluded to, but that the same is ideally adapted for fabrication in sheet metal. Obviously the boxlike form of the die lends substantial rigidity. Likewise it is within contemplation to reinforce the shell 11 by peripheral ribs, or to return the upper edge of the sides thereof inwardly for the same purpose.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A patty-making implement of the class described comprising a cutting member having a vertically disposed wall, the lower edge of the wall having a sharpened edge for severing the dough, a die guided by and positioned within said wall for vertical adjustment with respect to said edge, said die having an inwardly extending working face also inclined upwardly toward the vertical axis of the die for compressing and sealing the cut edges of the dough, and means for adjustably setting the position of said face relatively to said edge comprising at least a pair of latches secured to opposite points of said member, each latch having a horizontally disposed elongated lip and a plurality of sets of parallelly disposed elongated apertures at correspondingly opposite points of said die, said latches being arranged for movement to engage and disengage said lips with respect to said apertures to secure said die and member in a predetermined adjusted relation.

2. An implement in accordance with claim 1 in which said latch comprises a cantilever-mounted, resilient element.

3. A patty-making implement of the class described comprising a rectangular, thin, flat, four-walled shell defining a parallelepipedic space, the lower edges of the wall being sharpened for cutting a rectangular patty from the dough, a rectangular die for crimping the margin of the severed patty supported for adjustable movement within said shell, said die having a series of parallelly disposed, horizontally-extending slots in each of two opposite walls thereof, and means carried by said shell for maintaining an adjusted position of said die with respect to said shell comprising a pair of resilient vertically-positioned fingers having one end secured to said shell and an inwardly directed lip at the other end, each said lip being engageable and disengageable with respect to a selected one of each series of slots to secure an adjusted position of said die with respect to said shell.

DOMINEC J. CESARE.

References Cited in the file of this patent

UNITED STATES PATENTS

| Number | Name | Date |
|---|---|---|
| 582,439 | Smith | May 11, 1897 |
| 2,075,157 | Alberti | Mar. 30, 1937 |
| 2,214,475 | Napolillo | Sept. 10, 1940 |